(12) United States Patent
Filman et al.

(10) Patent No.: US 9,606,972 B2
(45) Date of Patent: Mar. 28, 2017

(54) DOCUMENT COLLABORATION WITH COLLABORATION CONTEXT DATA

(75) Inventors: Sarah M. Filman, Seattle, WA (US); Arcadiy G. Kantor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 13/292,448

(22) Filed: Nov. 9, 2011

(65) Prior Publication Data

US 2013/0117376 A1    May 9, 2013

(51) Int. Cl.
- *G06F 15/16* (2006.01)
- *G06F 17/24* (2006.01)
- *G06Q 10/10* (2012.01)
- *G06F 17/22* (2006.01)

(52) U.S. Cl.
CPC .......... *G06F 17/24* (2013.01); *G06F 17/2288* (2013.01); *G06Q 10/10* (2013.01); *G06Q 10/107* (2013.01)

(58) Field of Classification Search
CPC .. G06Q 10/10; G06Q 10/107; G06F 17/2288; G06F 17/24
USPC ......................................... 709/205, 206, 217
See application file for complete search history.

(56) References Cited

U.S. PATENT DOCUMENTS

| | | | |
|---|---|---|---|
| 5,008,853 A * | 4/1991 | Bly et al. ...................... | 715/751 |
| 5,220,657 A * | 6/1993 | Bly et al. ...................... | 711/152 |
| 5,671,428 A * | 9/1997 | Muranaga et al. ........... | 715/751 |
| 5,790,790 A * | 8/1998 | Smith et al. .................. | 709/206 |
| 5,790,793 A * | 8/1998 | Higley ........................... | 709/218 |
| 5,940,800 A * | 8/1999 | Bennett et al. ............... | 705/311 |
| 6,088,702 A * | 7/2000 | Plantz et al. | |
| 6,230,171 B1 * | 5/2001 | Pacifici et al. ................ | 715/201 |

(Continued)

FOREIGN PATENT DOCUMENTS

| | | |
|---|---|---|
| CN | 1577279 A | 2/2005 |
| CN | 1971553 A | 5/2007 |
| JP | 2002268938 A | 9/2002 |
| JP | 2007323561 A | 12/2007 |

OTHER PUBLICATIONS

"Features—Complete List", Retrieved at <<http://www.egnyte.com/file-server/online-file-server-features.html>>, Retrieved Date: Aug. 17, 2011, pp. 5.

(Continued)

*Primary Examiner* — Daniel C Murray (57) ABSTRACT

One or more techniques and/or systems provide for an entity to receive collaboration context data regarding activities that have taken place with respect to a document when the entity views a reference to the document comprised within a communication directed to the entity. For example, a hyperlink related to a document may be emailed to an entity when the document is shared with the entity. Subsequently, when the entity views the email comprising the hyperlink, the entity may be provided with contextual information regarding the document (e.g., entities that have viewed the document, edits other entities have made to the document, etc.). In one embodiment, such information may be presented to the entity in the same application (e.g., email client and/or email service) as the email. In this way, the entity may be provided with information that may help the entity assess whether to access a shared document, for example.

20 Claims, 6 Drawing Sheets

(56) References Cited

U.S. PATENT DOCUMENTS

| | | | |
|---|---|---|---|
| 6,282,548 B1* | 8/2001 | Burner et al. | |
| 6,289,460 B1* | 9/2001 | Hajmiragha | G06F 17/30011 700/83 |
| 6,314,425 B1* | 11/2001 | Serbinis et al. | |
| 6,507,845 B1* | 1/2003 | Cohen et al. | 707/608 |
| 6,584,466 B1* | 6/2003 | Serbinis et al. | 715/209 |
| 6,952,717 B1* | 10/2005 | Monchilovich et al. | 709/205 |
| 7,089,287 B2* | 8/2006 | Bellotti et al. | 709/206 |
| 7,139,800 B2* | 11/2006 | Bellotti et al. | 709/206 |
| 7,437,421 B2* | 10/2008 | Bhogal | G06F 17/24 705/35 |
| 7,454,466 B2* | 11/2008 | Bellotti et al. | 709/206 |
| 7,496,841 B2* | 2/2009 | Hadfield et al. | 715/255 |
| 7,552,190 B1 | 6/2009 | Freishtat et al. | |
| 7,581,165 B2* | 8/2009 | Cho et al. | 715/200 |
| 7,590,687 B2 | 9/2009 | Bales et al. | |
| 7,640,506 B2* | 12/2009 | Pratley et al. | 715/751 |
| 7,664,870 B2* | 2/2010 | Baek | G06F 17/30905 709/203 |
| 7,673,006 B2* | 3/2010 | Bhogal | G06F 17/24 709/205 |
| 7,680,820 B2* | 3/2010 | Denoue | G06Q 10/10 707/608 |
| 7,707,249 B2* | 4/2010 | Spataro et al. | 709/205 |
| 7,788,237 B2* | 8/2010 | Voronov et al. | 707/695 |
| 7,818,298 B2* | 10/2010 | Barker et al. | 707/638 |
| 7,822,738 B2* | 10/2010 | Andersen | G06F 17/30395 707/713 |
| 7,836,019 B2* | 11/2010 | Barker et al. | 707/638 |
| 7,848,984 B1* | 12/2010 | Robb | 705/36 R |
| 7,962,853 B2* | 6/2011 | Bedi et al. | 715/751 |
| 7,996,237 B2* | 8/2011 | Vedula | G06Q 10/063 705/1.1 |
| 7,996,779 B2 | 8/2011 | Martinez et al. | |
| 8,028,032 B2* | 9/2011 | Laird-McConnell | 709/206 |
| 8,074,173 B2* | 12/2011 | Hines et al. | 715/731 |
| 8,117,644 B2* | 2/2012 | Chaganti et al. | 726/2 |
| 8,255,800 B2* | 8/2012 | Moore et al. | 715/705 |
| 8,275,839 B2* | 9/2012 | Auerbach et al. | 709/206 |
| 8,280,962 B2* | 10/2012 | Muniz et al. | 709/206 |
| 8,429,194 B2* | 4/2013 | Aymeloglu et al. | 707/791 |
| 8,606,855 B2* | 12/2013 | Bhogal | G06F 17/24 709/204 |
| 8,650,154 B2* | 2/2014 | Nair | G06F 17/2288 707/610 |
| 8,725,679 B2* | 5/2014 | Nair | G06F 17/30581 707/608 |
| 8,806,355 B2* | 8/2014 | Twiss | G06Q 10/10 715/751 |
| 2003/0112273 A1* | 6/2003 | Hadfield et al. | 345/751 |
| 2003/0126136 A1* | 7/2003 | Omoigui | 707/10 |
| 2003/0135558 A1* | 7/2003 | Bellotti et al. | 709/206 |
| 2003/0135559 A1* | 7/2003 | Bellotti et al. | 709/206 |
| 2003/0135659 A1* | 7/2003 | Bellotti et al. | 709/313 |
| 2003/0167281 A1* | 9/2003 | Cohen et al. | 707/103 R |
| 2003/0197729 A1* | 10/2003 | Denoue | G06Q 10/10 715/751 |
| 2004/0021686 A1* | 2/2004 | Barberis | 345/738 |
| 2004/0021688 A1* | 2/2004 | Phillips | 345/762 |
| 2004/0172450 A1* | 9/2004 | Edelstein et al. | 709/205 |
| 2004/0205653 A1* | 10/2004 | Hadfield et al. | 715/530 |
| 2004/0267871 A1* | 12/2004 | Pratley et al. | 709/200 |
| 2005/0033811 A1* | 2/2005 | Bhogal | G06F 17/24 709/206 |
| 2005/0033813 A1* | 2/2005 | Bhogal | G06F 17/24 709/206 |
| 2005/0223061 A1* | 10/2005 | Auerbach et al. | 709/206 |
| 2006/0143558 A1* | 6/2006 | Albornoz et al. | 715/512 |
| 2006/0195507 A1* | 8/2006 | Baek | G06F 17/30905 709/203 |
| 2007/0038610 A1* | 2/2007 | Omoigui | 707/3 |
| 2007/0226032 A1 | 9/2007 | White et al. | |
| 2008/0059539 A1* | 3/2008 | Chin et al. | 707/203 |
| 2008/0133501 A1* | 6/2008 | Andersen | G06F 17/30867 |
| 2008/0162498 A1* | 7/2008 | Omoigui | 707/10 |
| 2008/0168134 A1* | 7/2008 | Goodman | G06F 17/30867 709/204 |
| 2008/0250474 A1* | 10/2008 | Bhogal | G06F 17/24 726/1 |
| 2008/0263155 A1* | 10/2008 | Bhogal | G06F 17/24 709/205 |
| 2008/0281608 A1* | 11/2008 | Vedula | G06Q 10/063 705/1.1 |
| 2008/0313546 A1* | 12/2008 | Nykamp | 715/738 |
| 2009/0013011 A1* | 1/2009 | Barker et al. | 707/203 |
| 2009/0013262 A1* | 1/2009 | Hamaguchi et al. | 715/751 |
| 2009/0024673 A1* | 1/2009 | Barker et al. | 707/203 |
| 2009/0049053 A1* | 2/2009 | Barker et al. | 707/10 |
| 2009/0083384 A1* | 3/2009 | Bhogal | G06F 17/24 709/206 |
| 2009/0171987 A1* | 7/2009 | Coppinger et al. | 707/100 |
| 2009/0210459 A1* | 8/2009 | Nair | G06F 17/2288 707/781 |
| 2009/0252312 A1* | 10/2009 | Muniz et al. | 379/112.01 |
| 2009/0254589 A1* | 10/2009 | Nair | G06F 17/30581 |
| 2009/0282341 A1* | 11/2009 | Hines et al. | 715/733 |
| 2010/0005398 A1* | 1/2010 | Pratley et al. | 715/751 |
| 2010/0057864 A1* | 3/2010 | Laird-McConnell | 709/206 |
| 2010/0070448 A1* | 3/2010 | Omoigui | 706/47 |
| 2010/0070464 A1* | 3/2010 | Aymeloglu et al. | 707/608 |
| 2010/0070531 A1* | 3/2010 | Aymeloglu et al. | 707/781 |
| 2010/0070842 A1* | 3/2010 | Aymeloglu et al. | 715/207 |
| 2010/0070844 A1* | 3/2010 | Aymeloglu et al. | 715/229 |
| 2010/0070897 A1* | 3/2010 | Aymeloglu et al. | 715/765 |
| 2010/0095198 A1* | 4/2010 | Bultrowicz et al. | 715/234 |
| 2010/0174997 A1* | 7/2010 | O'Sullivan et al. | 715/751 |
| 2010/0241611 A1 | 9/2010 | Zuber | |
| 2010/0268740 A1* | 10/2010 | Barker et al. | 707/783 |
| 2011/0016387 A1* | 1/2011 | Mundy et al. | 715/255 |
| 2011/0113348 A1* | 5/2011 | Twiss | G06Q 10/10 715/753 |
| 2011/0161826 A1* | 6/2011 | Moore et al. | 715/738 |
| 2012/0191716 A1* | 7/2012 | Omoigui | 707/740 |
| 2012/0221944 A1* | 8/2012 | Bloomfield et al. | 715/255 |
| 2012/0317414 A1* | 12/2012 | Glover | 713/165 |
| 2013/0018840 A1* | 1/2013 | Averbuch | G06Q 10/00 707/602 |
| 2013/0080545 A1* | 3/2013 | Datta | 709/206 |
| 2013/0346134 A1* | 12/2013 | Klug et al. | 705/7.15 |
| 2014/0032486 A1* | 1/2014 | Sharma | G06F 17/30699 707/608 |
| 2014/0082113 A1* | 3/2014 | Bhogal | G06F 17/24 709/206 |
| 2014/0114912 A1* | 4/2014 | Nair | G06F 17/2288 707/608 |

OTHER PUBLICATIONS

Mackie, Simon, "OffiSync Update Adds Co-authoring Abilities to Office", Retrieved at <<http://gigaom.com/collaboration/offisync-update-adds-co-authoring-abilities-to-office/>>, Apr. 15, 2010, pp. 5.

Huggins, Diana, "Work at the Same Time in Word Part II", Retrieved at <<http://www.lockergnome.com/it/2011/07/12/work-at-the-same-time-in-word-part-ii/>>, Jul. 12, 2011, pp. 2.

"International Search Report", Mailed Date: Mar. 28, 2013, Application No. PCT/US2012/063840, Filed Date: Nov. 7, 2012, pp. 11.

"First Office Action and Search Report Issued in Chinese Patent Application No. 201280055202.5", Mailed Date: Sep. 18, 2015, 17 Pages.

"Office Action Issued in Japanese Patent Application No. 2014-541175", Mailed Date: Apr. 26, 2016, 6 Pages.

"Search Report Issued in European Patent Application No. 12848104.1", Mailed Date: Oct. 11, 2016, 8 Pages.

"Office Action Issued in Japanese Patent Application No. 2014-541175", Mailed Date: Jan. 4, 2017, 3 Pages. (W/o English Translation).

* cited by examiner

DOCUMENT COLLABORATION WITH COLLABORATION CONTEXT DATA

BACKGROUND

Document collaboration is generally used to describe a process of and/or system for sharing a document with a plurality of entities and/or constructing a document via a plurality of entities. For example, a first entity may create an initial draft of a document and make the document accessible to one or more other entities. The other entities may then review the document and/or make changes to the document.

Some of the more common applications for document collaboration involve business settings. Traditionally, one or more in-house servers have been utilized to store a document, and entities with permissions to access the document were able to navigate to a specified location in a file directory of the one or more servers to view and/or modify the document. For example, a first entity may author the document and store it in a particular file location on the server. The entity may then notify the other entities to provide them with information on where the document is located and the other entities may read and/or review the document.

Today, cloud storage is growing in popularity for both business applications and personal applications. While the underlying concepts are similar to those of traditional, in-house servers, there are some differences. For example, cloud storage is generally an online storage database (e.g., typically accessible via a public web address, although it may be merely accessible via a private web address that is internal to a particular network(s)) hosted by a third party (e.g., although it may be hosted by the business and/or user). Moreover, the data is typically stored on virtualized pools of storage, as opposed to a fixed, physical storage device (e.g., the files that appear to be located on a particular drive may in fact be located on a plurality of different storage units and/or servers).

It will be appreciated that regardless of how and/or where data is stored (e.g., whether it be on an in-house server and/or in cloud storage), when a document is accessible by a plurality of entities it may be useful for respective entities to be aware of what other entities with access to that document are doing to the document (e.g., what changes others are making). Today there are several approaches for providing such information. For example, some programs, such as some word processing programs, allow an entity to track changes in a document. These changes may be displayed in a different font color and/or may be otherwise distinguished from the rest of the document when subsequent entities review the document. However, this approach generally requires an entity to open the document to determine whether changes have been made by another entity. Another approach is for the entity making the change to email the document to other entities with access to the document whenever edits are made. However, this approach may be undesirable because multiple copies of the same document may be distributed (e.g., making it difficult for an entity to know whether s/he is working on the most recent version) and/or because document attachments may increase a size of a mailbox of an entity.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for providing collaboration context regarding a document to one or more entities are provided. The collaboration context may comprise, among other things, information regarding entities that have accessed the document, information regarding entities that have modified the document, notice that a document has been modified, and/or information regarding the modifications made to the document. In one embodiment, the one or more systems and/or techniques find particular application with respect to the storage of a document in a cloud storage system, although the systems and techniques described herein are not intended to be limited to such an application to the extent practical. For example, in another embodiment, the one or more systems and techniques may be relevant in a more traditional storage environment, where files are stored on a storage drive merely accessible by other entities operably coupled to a same network as the storage drive (e.g., an in-house server environment).

In one embodiment, a first entity (e.g., an initial drafter) creates a document and stores the document on a storage device. A notification may then be transmitted to one or more other entities that are granted permissions to access the document and providing a hyperlink, for example, to access the documents. Entities that view the link (e.g., which may be comprised in an email, for example) may be presented with information regarding recent activity related to the document (e.g., in the email application where the email comprising the link is previewed). In this way, the entities with access to the document may become aware of activity that has taken place with respect to the document without actually viewing the document itself, for example.

By way of example, in a cloud storage environment, a first entity (e.g., owner) may create a document and upload the document to a cloud storage system. The first entity may then share the document with one or more other entities by designating as such in the cloud storage system (e.g., in a user interface associated with the cloud storage system), and an email or other notification may be sent to the one or more other entities (e.g., and the first entity) notifying the one or more other entities that the first entity has shared a document with them and/or providing a hyperlink for the first entity and the one or more other entities to access the document. Subsequently, when the first entity and/or another entity views the link (e.g., views the email comprising the link), information regarding recent activity associated with the document (e.g., collaboration context) may be retrieved and displayed to the entity viewing the link in the email application, for example. In this way, an entity can be made aware of recent activity without having to access the document and/or review the document to determine whether edits have been made since the entity last accessed the document, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One general approach for sharing documents with a plurality of entities comprises emailing or otherwise transmitting a document file to respective entities (e.g., causing respective entities to retain a local copy of the document). Another approach is to store the document on a central storage apparatus accessible by a plurality of entities (e.g., such as a cloud storage system and/or an in-house server system). One of the advantages of storing the document on a central storage apparatus is that respective entities can edit the same copy of the document (e.g., as opposed to the email approach where an entity edits a local copy of the document). Moreover, unlike the email approach where an entity that makes edits to the document emails the edited document to the other entities (e.g., providing a record of who made edits when) so that respective entities maintain an update-to-date version of the document, the centralized storage approach maintains an update-to-date version of the document (e.g., since entities edit the same copy of the document). However, with the centralized storage approach it may be difficult for an entity to easily know who viewed and/or made edits to the document.

Moreover, given the number of emails a typical entity receives, it may be difficult and/or burdensome for an entity to maintain a record of updates made to a document based upon an email chain, for example. Accordingly, as provided herein, collaboration context (e.g. information regarding the file) is provided in a manner that reduces the number of emails received by an entity (e.g., relative to the email notification techniques described above) and provides such information to the entity without the entity having to access (e.g., view) the document.

It will be appreciated that the term document is used in a broad sense herein to comprise an image file, spreadsheet, presentation, audio file, video file, word processing file and/or any other type of file, object, data, etc.

Figure 1:
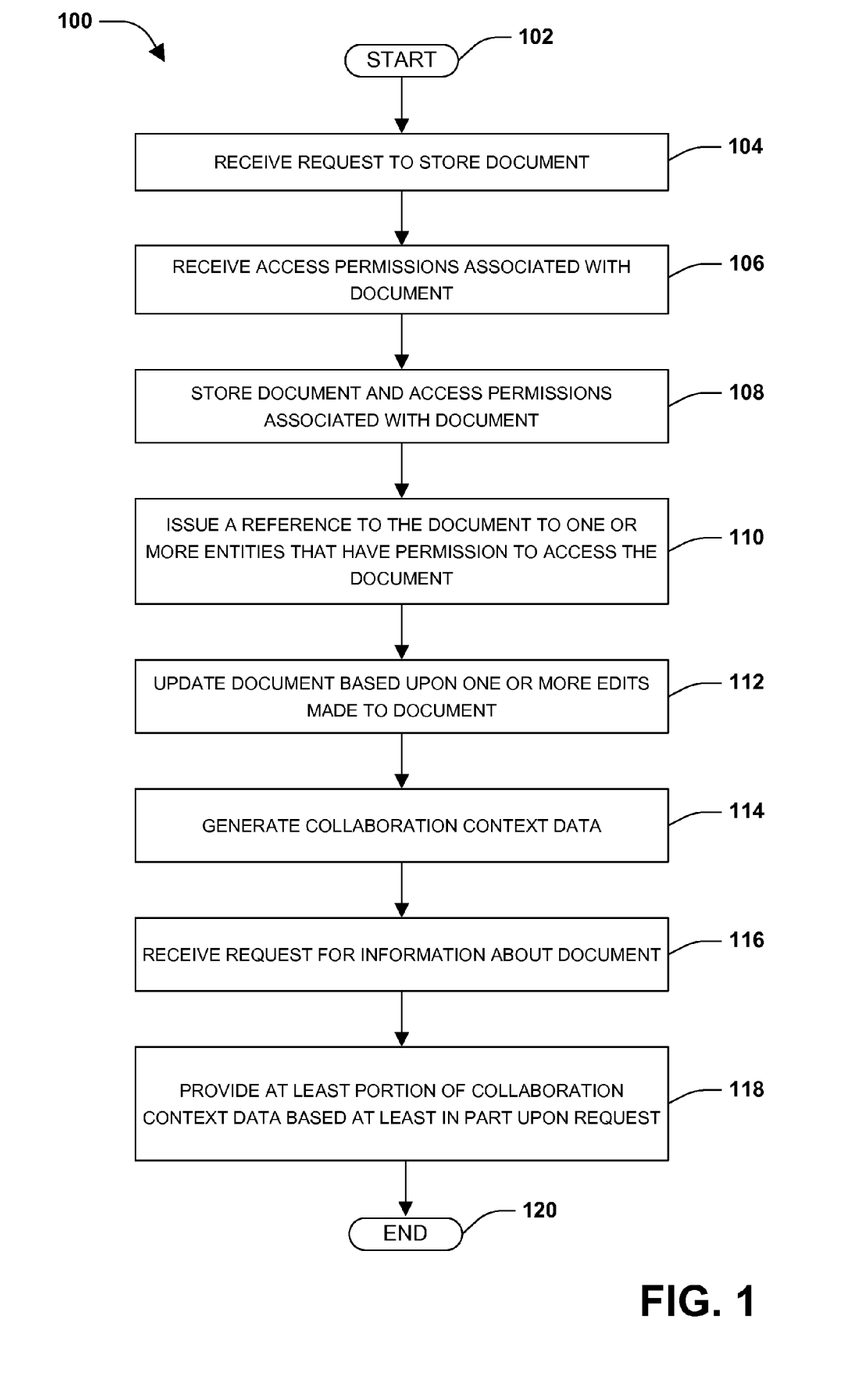
FIG. 1 is an exemplary method for document collaboration.

FIG. 1 illustrates an example method 100 for document collaboration (e.g., from the perspective of a server configured to store a document, manage access to document, and/or maintain a record of events related to the document). Such a method may find particular applicability to applications where a plurality of entities may view and/or edit a document (e.g., such as in a centralized server approach as described above). For example, the document may be stored and/or edited via a cloud storage service configured to provide a plurality of entities with access to the document over the world-wide-web. However, the instant application, including the scope of the claims, it not intended to be limited as such. For example, the example method 100 may find application in other environments, such as corporate environments, where documents are stored and/or accessed on a centralized database accessible merely by entities associated with a corporation.

The example method 100 begins at 102, and a request to store a document (e.g., in a centralized storage database accessible by a plurality of entities) is received at 104. The request may or may not comprise the document to be stored. For example, in one embodiment, an entity may log into a web interface via access credentials, select an option to store the document (e.g., causing a request to store the document to be received) and select the document to the stored in the centralized storage database via the web interface. In another example, the mere act of inputting the document into the web interface and selecting to upload the document may constitute a request to store the document (e.g., the request to store the document may comprise the document itself). In another example, an entity may have mapped a location on the centralized storage database to his/her local computing device, and the entity may upload the document by saving the document in the mapped location and/or copying the document to the mapped location. Thus, the request, including the document, may be transmitted from a device associated with an entity to a centralized storage database, where the document may be received and stored.

The method 100 also comprises receiving access permissions indicative of one or more other entities that are granted permission to view and/or modify the document at 106. It will be appreciated that the access permissions may be received before, at the same time as, or after the request to store the document is received at 104. By way of example, in one embodiment, access permissions for one or more folders in which the document can be stored are predefined, and the access permissions for the received document may be a function of a location where the document is to be stored in the centralized storage database. As an example, a first folder may provide entities A, B, and C with read/write access to documents comprised in the first folder and a second folder may provide entities A, B, C, and D with merely read access. If the received document is to be stored in the first folder, entities A, B, and C may be granted read/write access by default whereas if the received document is to be stored in the second folder, entities A, B, C, and D may be granted merely read access by default. Thus, the access permissions may be received prior to the document and may apply to more than just the document (e.g., the permissions may apply to any document stored in the particular folder and/or drive to which the received access permissions relate).

In other embodiments, the access permissions received at 106 may be received at the same time as the request to store the document is received at 104 and/or may be received after the request to document is received at 104. For example, in one embodiment, as part of the uploading process, the entity uploading the document to the centralized storage database may be requested to enter and/or select information about one or more other entities that may access and/or edit the document (e.g., user identification information). In another embodiment, the request to store the document (e.g., which may comprise the document) may be received at 104 and, in response, the entity uploading the document may be prompted to provide access permissions for zero or more other entities that the entity desires to share the document with (e.g., thus causing the access permissions to be received after the request to store the document is received).

It will be appreciated that the access permissions may also be modifiable by the entity at the time the document is received and/or thereafter, for example. As an example, the entity uploading the document may specify to store the document in a folder that has default access permissions for one or more entities, and the entity may alter the default access permissions to change the access permissions for the document and/or for a folder within which the document is to be stored. In another embodiment, after the document is stored and/or made available to one or more other entities, the entity that uploaded the document may alter the access permissions for the document, causing modified access permissions for the document to the received (e.g., altering the permissions for one or more entities that previously had access to the document and/or creating permissions for one or more new entities).

At 108 in the example method 100, the document and access permissions associated with the document are stored. For example, the documents may be stored in a database accessible by entities associated with a particular network (e.g., an internal network of a company) and/or accessible by entities via a more global network, such as the world-wide-web (e.g., with documents being protected using an access credential technique). It will be appreciated that while the example method 100 provides for storing the document and the access permissions in a single act, the act of storing the document may occur at a different time than the act of storing access permissions. For example, where access permissions are not set until after the document is uploaded, the document may be stored prior to the receipt and/or subsequent storage of the access permissions.

At 110 in the example method 100, a reference to the document is issued to one or more entities that have permission to access the document. Generally, the reference is configured to direct and/or navigate one or more users to a location in the database where the document can be found. For example, in one embodiment, a hyperlink to the document is issued in an email that is transmitted to one or more entities that have permission to access the document. In this way, the one or more entities that have access to the document are made aware of such access and/or the one or more entities may be provided a link that navigates the entities directly to the document (e.g. reducing the number of menus the one or more entities may have to navigate to access the document).

At 112 in the example method 100, the document is updated based upon one or more edits made to the document. For example, an entity (e.g., either the entity that uploaded the document and/or another entity with access to the document) may access the document and make changes to the document, creating a modified document. Such changes may be tracked (e.g., providing in-line edits that are distinguishable from the original characteristics (e.g., text) of the document) and/or not tracked (e.g., such that the edits are indistinguishable from the original characteristics except upon a comparison of the original document and the modified document).

It will be appreciated that typically, the modified document replaces the original document stored at 108. Thus, subsequent to the modification of the document to generate the modified document, entities that attempt to access the document may actually access the modified document. For example, entities that select the reference issued at 110 may be directed to the modified document as opposed to the original document to which the reference was directed when it was issued at 110. Although, in one embodiment, the original documents and/or other modified documents generated therefrom may also be accessible (e.g., such as by viewing a previous history of the modified document), for example.

At 114 in the example method 100, collaboration context data is generated. In one embodiment, such collaboration context may be generated in response to the one or more edits made to the document and may comprise, among other things, information regarding an entity that made at least some of the edits to the document to generate the modified document and/or information regarding the one or more edits that were made to the document to generate the modified document. However, it will be appreciated that the collaboration context is not intended to be so limited. For example, the collaboration context data may also and/or instead comprise information indicative of entities that accessed the document (e.g., even if those entities did not make edits). In this way, the collaboration context data may, for example, comprise a history of events that have taken place with respect to the document since the document was initially uploaded and/or stored.

Moreover, it will be appreciated that the collaboration context may be generated before edits are made to the document and/or may include content other than content regarding edits made to the document and/or information indicative of entities that accessed the document. For example, the collaboration context may comprise information related to other files comprised in a same folder and/or located in a same (and/or different) directory as the stored document. For example, the collaboration context may comprise links to other documents stored in the same folder and/or may comprises information about other entities that have access to the document (e.g., about entities with whom the document has been shared). For example, information from profiles comprised in a company directory, on a social network, etc. may be comprised within the collaboration context (e.g., and provided to an entity when an entity views a reference to a document as described herein). Thus, collaboration context is not intended to be limited to information related to edits made to a document but may additionally or alternatively comprise other information that may be useful to in understanding activity related to the document and/or entities with whom the document is shared.

It will be appreciated that the types of information comprised in the collaboration context data may depend upon, among other things, user preferences, capabilities of a service creating/maintaining the data, size limitations of the data, etc. For example, if a document is viewable by a large number of entities and is accessed frequently, it may be undesirable to record an entry in the collaboration context data whenever an entity accesses the document because the size of the data may become too large. Instead, it may be desirable to merely record information regarding who made edits to the document, when those edits were made, what the edits were made, etc. In another embodiment, such as where the document is viewable by a smaller number of entities, it may be desirable to record information regarding when and/or who access the document (e.g., along with information regarding edits made to the document, etc.).

It will also be appreciated that generally speaking, the collaboration context data comprises less than all of the original document and/or comprises less than all of the modified document (e.g., and may comprise none of the original document and/or modified document). That is, the collaboration context data is generally not the document that is being modified and/or previously modified, but other information relating to such a modification (e.g., information relating to who modified the document, what was modified, and/or when it was modified). For example, the collaboration context may comprise the edits made to the original document but may not comprise unedited portions of the original document (e.g., which are likewise comprised in the modified document).

After collaboration context has been generated at 114, it may be desirable to provide such information to the one or more entities that were issued a reference at 110 (e.g., including the entity that uploaded the document) when the entities view the reference (e.g., in his/her email service and/or client where the reference is issued in an email).

For example, at 116 in the example method 100, a request for information regarding the document (e.g., and/or one or more edits made to the document) is received. That is, stated differently, a request for the collaboration context data is received at 116. As an example, in one embodiment, when one or more of the entities to whom the reference was issued at 110 view the reference (e.g., view an email comprising the reference), a request may be made for collaboration context data (e.g., if any exists).

It will be appreciated that, in one embodiment, the request for collaboration context data may relate to a mere portion of the collaboration context data. By way of example, a user desiring to view the collaboration context data may be merely concerned with collaboration context data related to edits made to the document (e.g., as opposed to collaboration context data related to who has viewed the document) and the request may thus be directed merely to a portion of the collaboration context data relating to edits. As another example, the request may be directed to collaboration context relating merely to edits made by a specific one or more of the entities. Thus, the received request may be limited to a particular aspect(s) of the collaboration context data and/or may be a more general request for information (e.g., requesting any and/or all collaboration context data), for example.

If there is no collaboration context data (e.g., no edits have been made, no one has accessed the document since it was uploaded, etc.), the request may be left unfilled and/or a notice may be transmitted to the device making the request notifying the device that no such collaboration context data is available.

If, on the other hand, collaboration context data is available, at least a portion of the collaboration context data generated at 114 is provided at 118 in the example method 100 based at least in part upon the request. By way of example, where the request is received from an email application (e.g., an email client and/or email service), at least a portion of the collaboration context data generated by the centralized storage apparatus may be sent to the email application for display to an entity associated with the email application (e.g., who has permission to access and/or edit the document). In this way, an entity to whom the reference was issued can be updated regarding modifications and/or progress made with respect to the document since the document was first uploaded (e.g., and the reference issued) without having to view the document, for example.

It will be appreciated that the degree to which the collaboration context data is provided at 118 may depend upon, among other things, the request received at 116. For example, where the request is specific to a particular type of collaboration context (e.g., merely requesting information regarding edits made to the document as opposed to information regarding who has accessed the document), merely a portion of the collaboration context data that satisfies the request may be provided at 116. Where the request is more generic, however, the provided portion of the collaboration context data may comprise substantially all of the collaboration context data, for example.

Moreover, it will be appreciated that in one embodiment, the fulfillment of the request by providing at least a portion of the collaboration context data at 118 may depend at least in part upon the entity that made the request continuing to have permission to access the document to which the collaboration context data being requested relates. For example, in the time interval between when the reference to the document was issued to an entity at 110 and the time the request was received at 116, the access permissions may have been modified such that the entity making the request does not have permission to access the document when the request is received. Therefore, in one embodiment, a check may be performed to verify that an entity making the request has permission to access the document before the request is fulfilled at 118. If the access permissions for the entity making the request have been revoked and/or otherwise changed such that the entity making the request is not permitted to access the document or has different access privileges at the time of the request is received, the request may be denied or satisfied in a modified manner such that no or a limited amount of collaboration context data may be provided at 118, for example. However, if the entity making the request continues to have permission to access the document, the collaboration context data 118 may be provided at 118.

The example method 100 ends at 120.

Figure 2:
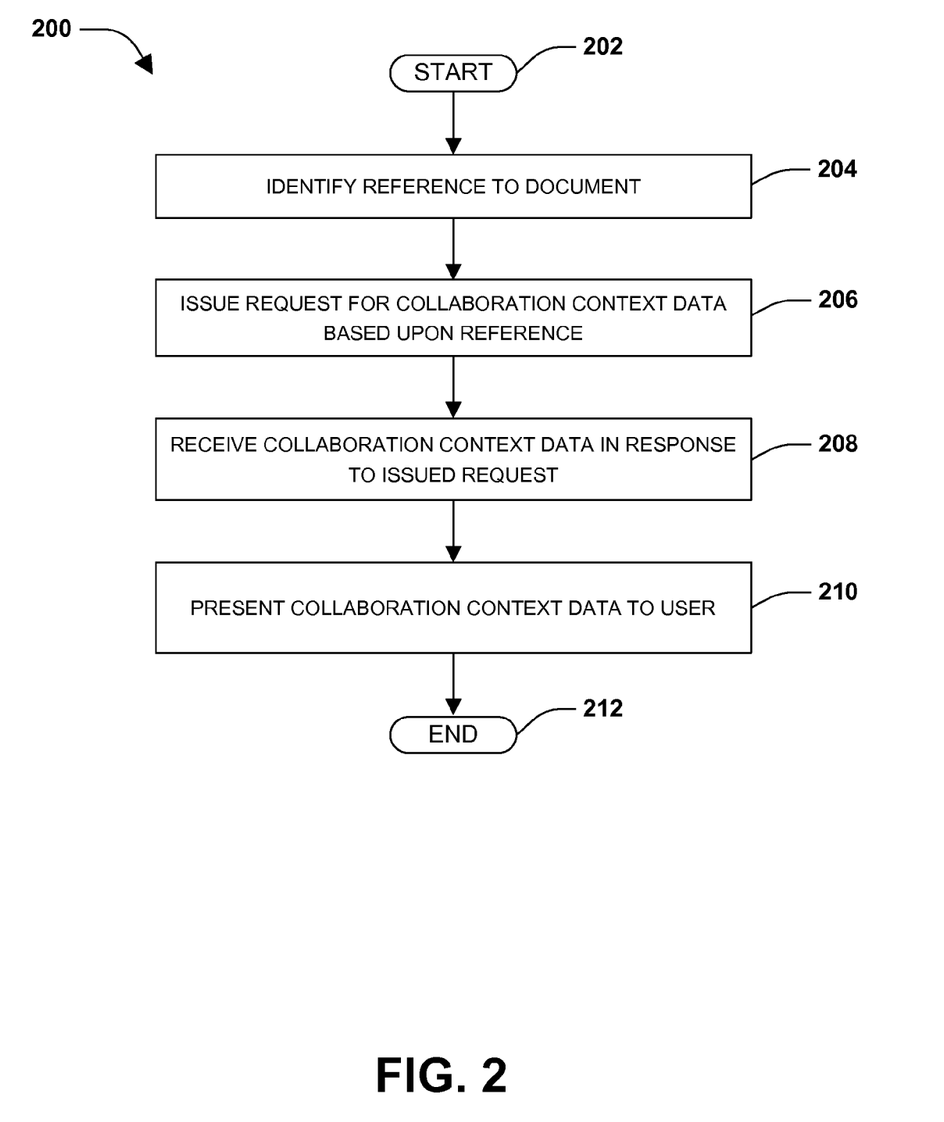
FIG. 2 is an exemplary method for document collaboration.

FIG. 2 illustrates an example method 200 for document collaboration (e.g., from the perspective of a client receiving collaboration context related to a document stored in a database accessible by a plurality of entities). Such a method may find particular applicability to applications where a plurality of entities may view and/or edit a document. For example, the document may be stored and/or edited via a cloud storage service configured to provide a plurality of entities with access to the document over the world-wide-web. However, the instant application, including the scope of the claims, it not intended to be limited as such. For example, the example method 200 may find application in other environments, such as corporate environments, where documents are stored and/or accessed on a centralized database accessible merely by entities associated with the company.

The example method 200 begins at 202 and a reference to the document is identified at 204. By way of example, an email may be received (e.g., from a management component of a cloud service) configured to direct an entity to a document accessible by the entity that has been uploaded to the cloud service via another entity and/or shared with the entity by the other entity. As an example, the email may comprise a reference, such as a hyperlink, to the document that the user can select to be navigated to the document (e.g. provided the user enters the proper access credentials), and an email application (e.g., such as an email client and/or email service) may be configured to identify the reference in the email.

By way of example, the email application may comprise a set of instructions that guide the email application in determining whether the reference (e.g., hyperlink) is directed to a document (e.g., comprised in a centralized database) and/or is directed to other information not related to a shared document (e.g., such as a hyperlink to an email address and/or a hyperlink to a webpage of a company and/or news article). For example, the instructions may provide the email application with a list of prefixes and/or suffixes that are associated with a document sharing site. If the reference comprises a prefix and/or suffix that is listed as being associated with a document sharing site, the reference may be identified as possibly being associated with a document. Conversely, if the reference comprises a prefix and/or suffix not comprised within the list, then the reference may not be identified as possibly referencing a document. It will be appreciated that the example technique is merely intended to provide one possible way of identifying a reference associated with a document, and other techniques for making such an identification are also contemplated herein.

In one embodiment, the determination of whether a reference is associated with a document may be made whenever an email (e.g., or other form of communication that may comprise references, such as an instant message) is previewed or otherwise selected. That is, it will be appreciated that the identification may not be made merely upon receipt of the email and/or other communication, but may instead by made whenever a user views an email and/or other communication that may comprise a reference, for example. By way of example with respect to an email application, when an email comprising a hyperlink and/or other potential reference to a document is received, the email application may attempt to determine whether the reference is associated with a document. In one embodiment, if the email application identifies a reference to the document, the email application may flag that email so that when the email is previewed and/or opened (e.g., each time it is previewed or opened, and not necessarily just the first time), the email application attempts to acquire collaboration context data related to the document the reference identifies (e.g., such that fresh collaboration context data is presented, maintained, etc.). In another embodiment (e.g., where emails are not flagged), the email application may scan emails whenever they are previewed and/or opened to identify a reference to a document and/or acquire collaboration context data related to the document the reference identifies. Thus, a reference to a document may be identified when a communication comprising the reference is received and/or whenever a communication comprising the reference is previewed and/or opened, for example.

It will be appreciated that while reference is made herein to identifying the reference to the document in an email, the scope of the disclosure, including the appended the claims, is not intended to be so limited. For example, the reference may be identified in an instant message, message board, internal website, etc.

At 206 in the example method 200, a request for collaboration context data is issued based upon the identified reference, and collaboration context is received in response to the issued request at 208. As described above, the collaboration context data generally relates to events that have occurred since the document to which the identified reference relates was uploaded to the centralized server apparatus. For example, among other things, the collaboration context may provide information about who has accessed the document since it was uploaded, who made edits to the document, when edits were made, and/or what edits were made to a document.

As described with respect to FIG. 1, it will be appreciated that the issued request may be a general request for information and/or may be a request for specific types of information. For example, an entity may specify in the settings of an application configured to issue the request that the entity merely desires information relating to edits made to the document and/or may specify that the entity merely desires information relating to collaboration context that was generated since the entity last previewed and/or opened the communication comprising the reference. Thus, the request issued at 206 may be limited to specific forms of collaboration context data and/or may be limited to collaboration context data generated within a specific time frame, for example. Alternatively, the request issued at 206 may be a generic request for information.

In one embodiment, the collaboration context data received at 208 may be a function of the request issued at 206. For example, where the request was limited to specific forms and/or time frames of collaboration context data, the received collaboration context data may be limited to those specific forms and/or time frames. However, where a more generic request for information is issued, the received collaboration context data may comprise substantially all of the collaboration context data generated by the centralized storage apparatus (e.g., at 114 in the example method 100 of FIG. 1). Similarly, the collaboration context data received at 208 may be a function of access privileges associated with the requesting entity (e.g., which may have changed over time, such as since a last/recent request made by the requesting entity).

At 210 in the example method 210, the collaboration context is presented to the user. As will be described with respect to FIG. 3, it will be appreciated that the collaboration context may be presented within the email application and/or other program configured to present the communication comprising the reference to the entity and/or may be presented in a separate window (e.g., of a separate application) (e.g., alongside the application displaying/comprising the reference).

The example method 200 ends at 212.

For purposes of clarifying the methods described in FIGS. 1 and 2, reference will now be made to an example application. It will be appreciated that the example methods described above are not intended to be limited to such an application. Moreover, it will be appreciated that the acts described with respect to FIGS. 1 and 2 are merely example acts and are not intended to be interpreted in a limiting manner.

Suppose a first entity desires to share a document s/he created with other entities. The first entity may upload the document to a centralized storage apparatus and specify to whom the first entity desires to share the document. Notice, including a reference to the document, may then be transmitted to the one or more entities with whom the first entity desired to share his/her document. For example, an email may be transmitted to the first entity, a second entity, and a third entity, etc. providing the entities with a hyperlink to access the document. The second entity may view the email and a request for collaboration context data may be issued to the centralized storage apparatus, for example. If the document has not yet been edited and/or viewed prior to the request, the centralized storage apparatus may issue a response providing that no collaboration context data has been generated, may provide no response, and/or may provide collaboration context data merely indicative of the original upload (e.g., because no one has viewed and/or edited the document since it was uploaded). If the centralized storage apparatus provides collaboration context data indicative of the original upload (e.g., specifying a date stamp of the upload and/or an entity who uploaded the document), such information may be presented to the entity viewing the email, for example.

The second entity may then proceed to select the hyperlink, access the document, and make edits to the document (e.g., causing (additional) collaboration context data to be generated). Subsequently, when the first entity, second entity, and/or third entity preview and/or open the email, a request for collaboration context data may be transmitted from the email application of the entity previewing/viewing the email to the centralized storage apparatus. Upon receipt of the request, the centralized storage apparatus may provide the newly generated collaboration context data (e.g., indicative of the edits made by the second entity) to the email application, and the email application may display the information to the entity viewing and/or previewing the email. In this way, the entities with whom a document is shared may be provided information relating to the document without having to open the document. Thus, an entity can make a determination whether another entity has made changes to the document since the last time s/he read the document without having to open the document and/or search for edits, for example. It may be appreciated that this may reduce resource (e.g., bandwidth) utilization as collaboration context data generally comprises a smaller amount of data than the related document (e.g., that would otherwise have to be routinely uploaded, downloaded, etc. to make an assessment as to whether the document has been modified).

Moreover, in one embodiment, the email application or other application comprising the reference may provide an indication that new collaboration context exists without an entity having to view and/or preview the email. By way of example, the email application may be configured to periodically perform a check with a server that stores that collaboration context. If the email application identifies a change in the collaboration context data since the last check (e.g., or since the last time the entity viewed the collaboration context data in the email application), the email application may provide to the entity associated with the email application an indication that new collaboration context data exists. For example, the email application may post a flag next to the email comprising the reference when the email application identifies new collaboration context data, may mark the email comprising the reference as unread, and/or may move the email comprising the reference to a specified location (e.g., a top of an email list) to indicate to the entity that the collaboration context has been altered, etc. In this way, the entity may be made aware of a change in the collaboration context without having to view and/or preview a communication comprising the reference, for example.

Figure 3:
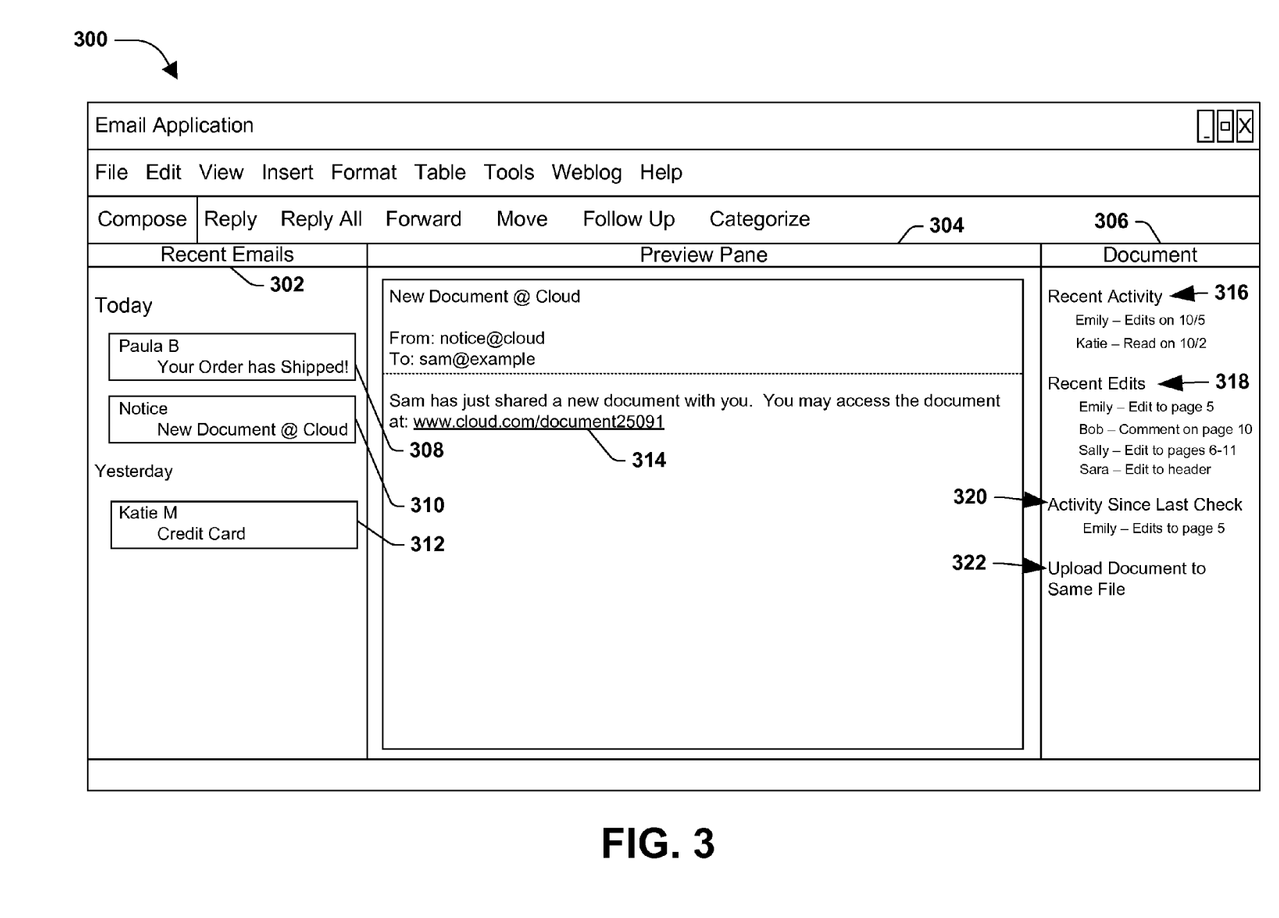
FIG. 3 illustrates an exemplary user interface wherein collaboration context data may be displayed to an entity.

FIG. 3 illustrates an example user interface 300 for displaying collaboration context data in an email application (e.g., such as one executed via a processor of a client device and/or displayed as a webpage via an internet browser of a client device). It will be appreciated the example user interface 300 is merely intended to provide clarity and is not intended to be interpreted in a limiting manner. For example, in another embodiment, the collaboration context data may be displayed in a user interface that is separate from an email application and/or other communication application. Moreover, it will be appreciated that while the example user interface 300 illustrates the collaboration context data as presented concurrently with the notification (e.g., email), it will be appreciated that the collaboration context can also and/or instead be displayed concurrently with the document (e.g., which can be accessed via the notification) and/or a modified document generated therefrom (e.g., that comprises edits made to the document).

As illustrated, the example user interface is divided into three sections. A first section 302 displays recently received emails and/or other communications. A second section 304 displays a preview of an email and/or other communication selected in the first section 302, and the third section 306 displays collaboration context data of a document referenced in a communication being previewed in the second section 304 (e.g., if a document is referenced in the communication being previewed). For example, as illustrated, three emails 308, 310, and 312 have been recently received and are displayed in the first section 302, and the second listed email 310 has been selected, causing the contents of the email 310 to be displayed in the second section 304 (e.g., causing the contents of the email 310 to be previewed).

As described with respect to the example method 200 of FIG. 2, the email application and/or other program may be configured to scan previewed and/or opened emails to determine whether the email comprises a reference to a shared document. For example, in the illustrated example, the email 310 that is previewed in the second section 304 comprises a hyperlink 314, and the email application may be configured to determine whether such a hyperlink (e.g., reference) is associated with a shared document. As an example, the email application may compare the hyperlink to a list of websites that are known to comprise shared documents. If the hyperlink is related to a listed website (e.g., the prefix www.cloud.com is comprised in the list), the email application may issue a request for collaboration context data related to the referenced document. For example, the email application may call a service associated with the hyperlink to retrieve collaboration context data.

In the illustrated embodiment, collaboration context data that has been retrieved for the referenced document is displayed in the third section 306 concurrently with the email 310 comprising the reference to the document being displayed in the second section 304, for example. As described with respect to the example methods 100 and 200 of FIGS. 1 and 2, respectively, the content of the collaboration context data that is displayed in the third section 306 may depend upon at least in part upon, but is not limited to, specifications of the centralized storage apparatus (e.g., limiting the amount of collaboration context data that may be maintained), specifications of the entity that uploaded the document (e.g., specifying the types of events that can be logged in the collaboration context data), and/or specifications of the entity using the email application (e.g., specifying the types of events s/he desires to and/or is permitted to view in the third section 306).

In the illustrated example, the collaboration context data displayed in the third section 304 is categorized into various categories to allow the entity viewing the user interface to more quickly interpret the collaboration context data. For example, the third section provides for a first category 316 related to recent activities with respect to the document, a second category 318 related to recent edits made to the document 318, and a third category 320 related to events that have occurred with respect to the document since the entity last previewed and/or opened the email 310 comprising the reference in the email application. It will be appreciated that the same data may appear in multiple sections and/or different data related to the same entry may appear in different sections. For example, in the illustrated example, the notation regarding Emily is displayed in all three categories 316, 318, and 320 because the edits made by Emily to the referenced document have occurred since the entity associated with the email application last previewed the email and/or are more recent relative to other events that have taken place with respect to the document.

It will also be appreciated that in one embodiment, an entity may select one or more of the entries in the third section 306 to view more detail regarding the displayed entry. For example, the entity may select the entry pertaining to Sally and be provided with additional information regarding the edits made by Sally. Such additional information may include, among other things, text that Sally inserted into the document, text that Sally deleted from the document, etc.

It will be appreciated that by providing this collaboration context data upon an entity viewing a reference to the document, the entity may be made aware of recent changes and/or edits to a document without having to acquire and/or review the document. Moreover, the collaboration context data may provide a succinct log of events that have occurred with respect to the document (e.g., as opposed to an email chain which may require a user to sift through pages of text before gathering a substantially complete view of activities that have taken place).

It will also be appreciated that the example user interface 300 of the email application and/or other communication application, for example, may also provide other features with respect to the document. For example, in one embodiment, the user interface 300 provides that entity using the email application with a manner of uploading other documents to the centralized storage apparatus that are related to the document referenced in the email, for example. By way of example, in the illustrated embodiment, the third section 306 of the example user interface 300 comprises an upload document to same file link 322 that may allow the entity using the application to upload a document to share with others entities that also have access to the referenced document. For example, the referenced document may comprise a technical paper, and upon review of the referenced document and/or the comments/edits made by others, the entity using the email application may wish to upload another document that might be useful to reference in the technical paper. Instead of accessing an interface of the cloud storage apparatus to upload the technical paper, the entity may merely select the upload document to same file link 322 and the document may be uploaded to the folder that comprises the referenced document (e.g., and shared with the other entities that have access to the referenced document), for example.

Figure 4:
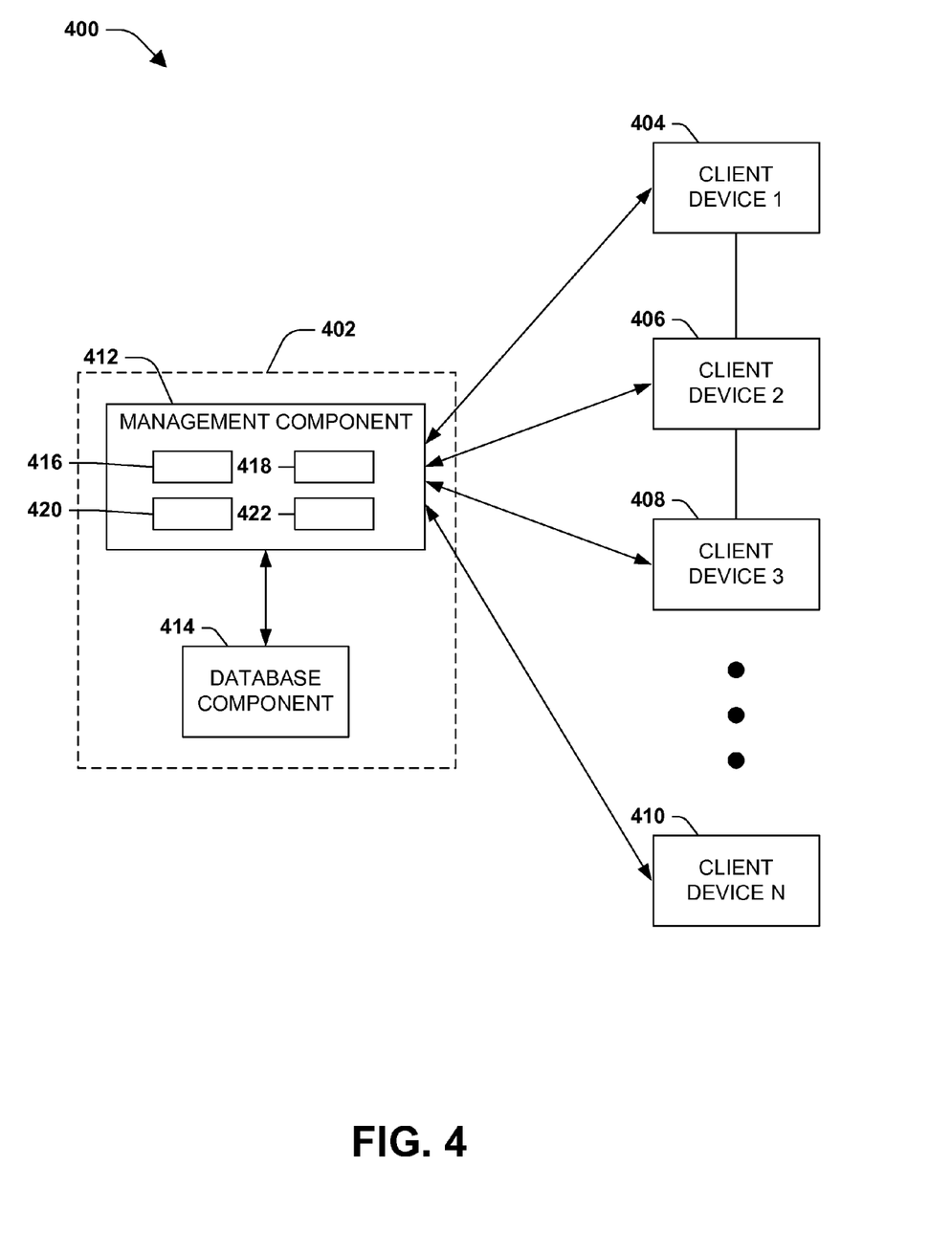
FIG. 4 illustrates an exemplary system for document collaboration.

FIG. 4 illustrates an example environment of an example system 400 for document collaboration. More particularly, FIG. 4 illustrates an example system 400 where a document is uploaded to a centralized database apparatus 402 (e.g., also referred to herein as a centralized storage apparatus) that is accessible by a plurality of entities (e.g., or client devices 404, 406, 408, 410 respective associated with an entity). As an example, the centralized database apparatus may comprise a cloud storage service and/or other server-based storage system where documents may be accessed by a plurality of entities.

As an example, a first client device 404 associated with a first entity may upload a document to be shared to a management component 412 of the example centralized database apparatus 402. For example, in one embodiment, the management component 412 comprises, among other things, an upload component 416, configured create one or more channels through which documents can be received and/or to receive one or more documents from a client device 404, 406, 408, and/or 410. As an example, the upload component 416 of the management component 412 may provide a web interface, and the first client device 404 may upload the document through the web interface via a browser application, for example. In another embodiment, the management component 412 may provide other manners of allowing the first client device 404 to upload the document. As an example, the upload component 416 may create a virtual drive that the first client device 404 can access (e.g., map to) to upload the document into the virtual drive, for example. It will be appreciated that the aforementioned techniques are merely examples techniques through which the upload component 416 may provide for uploading data and/or merely example techniques for uploading data, and the instant application, including the scope of the claims, it not intended to be so limited to the extent practical.

The management component 112 may also be configured to set access permissions for the document and/or receive data indicative of access permissions from the first client device 404 when the document is uploaded, before it is uploaded, and/or after it is uploaded. For example, the management component 412 may comprise an access permission component 418 configured to set access permissions for the document based upon default access permissions (e.g., which may have been preset by the entity associated with the first client device 404 that is uploading the document) and/or may be configured to receive data indicative of access permissions from the entity associated with the first client device 404 when the document is uploaded and/or after the document is uploaded, for example. As an example, in one embodiment, when a document is uploaded through a web interface, the web interface may also provide the entity uploading the document with the option to share the document with one or more other entities. The user may then select to share the document and/or specify access permissions for one or more entities with whom the entity uploading the document desires to share the document. As an example, the entity uploading the document may enter email addresses of those entities with which s/he desires to share the document into the web interface and/or specify whether respective entities have read and/or write access, may merely view when an edit occurred but not who made the edit, etc.

The uploaded document and/or its associated access permissions may be stored in a database component 414 of the example centralized database apparatus 402. As an example, the upload component 416 may be configured to provide the received document to the database component 414 and/or the access permission component 418 may be configured to provide access permissions corresponding to the received document to the database component 414. It will be appreciated that the structure of the database component 414 and/or the organization of files comprised therein may vary and are beyond the scope of the instant disclosure. Thus, it may be sufficient to merely provide that the document and its associated access permissions may be stored together (e.g., as a single file) and/or may be stored separately (e.g., in different files).

The management component 412 may also be configured to provide a notification indicative of a location of the file in the centralized database apparatus 402 and/or a manner of accessing the file. For example, in one embodiment, the management component 412 may comprise a notification component 420 configured to issue a reference to the document to the zero or more entities with which the entity that uploaded the document desired to share the document with (e.g., and may also issue a reference to the document to the entity that uploaded the document to assist the entity in accessing the document in the future). For example, the notification component 420 may be configured to issue an email and/or other communication comprising a hyperlink to the document to the entity that uploaded the document and the zero or more entities with whom the entity that uploaded the document desired to share the document. By way of example, the notification component 420 may issue an email comprising the hyperlink to the first client device 404 because the first entity uploaded the document and to the client devices labeled 2-N 406, 408, 410 because the first entity desired to share the document with entities respectively associated with the client devices labeled 2-N 406, 408, 410.

The management component 412 may also comprise a collaboration context generator 422 configured to generate data indicative of recent activity with respect to a document (e.g., which may be stored in the database component 414). For example, the collaboration context generator 422 may create a log, where respective entries are indicative of an activity that has taken place with respect to the document. By way of example and not limitation, such activities may include reading the document, editing the document, commenting on the document, etc. Moreover, it will be appreciated that the detail comprised in the log may depend upon numerous factors, including but not limited to, configurations and/or capabilities of the collaboration content generator, specifications of the entity that uploaded the document, etc. For example, the log may comprise the text of edits and/or may merely provide that edits were made at a specific time and/or by a specific entity (e.g., without specifying what those edits were).

The collaboration context generator 422 may also be configured to receive requests for collaboration context data from one or more client devices associated with entities viewing a reference to the document and/or to respond to those request. By way of example, the collaboration context generator 422 may receive a request from the second client device 406 when an entity associated with the second client device 406 views the notification sent to the second client device 406 by the notification component 420. The collaboration context generator 422 may also be configured to process the request by retrieving at least a portion of the collaboration context data from the database component 414 and/or sending the portion of the collaboration context to the second client device 406.

As described above, the client devices 404, 406, 408, 410 are respectively configured to present the collaboration context that is received from the collaboration context generator 422, for example, to the entities respectively associated with the client devices 404, 406, 408, 410 when the respective entities view the notification that is transmitted from the notification component 420. For example, in one embodiment, the client devices 404, 406, 408, 410 are configured to present the collaboration context data in an email application that is executed at least in part via a processor (e.g., respectively comprised in the client devices 404, 406, 408, 410) when a user previews and/or opens an email notification that was transmitted from the notification component 420 and/or that comprises a reference to the document.

Figure 5:
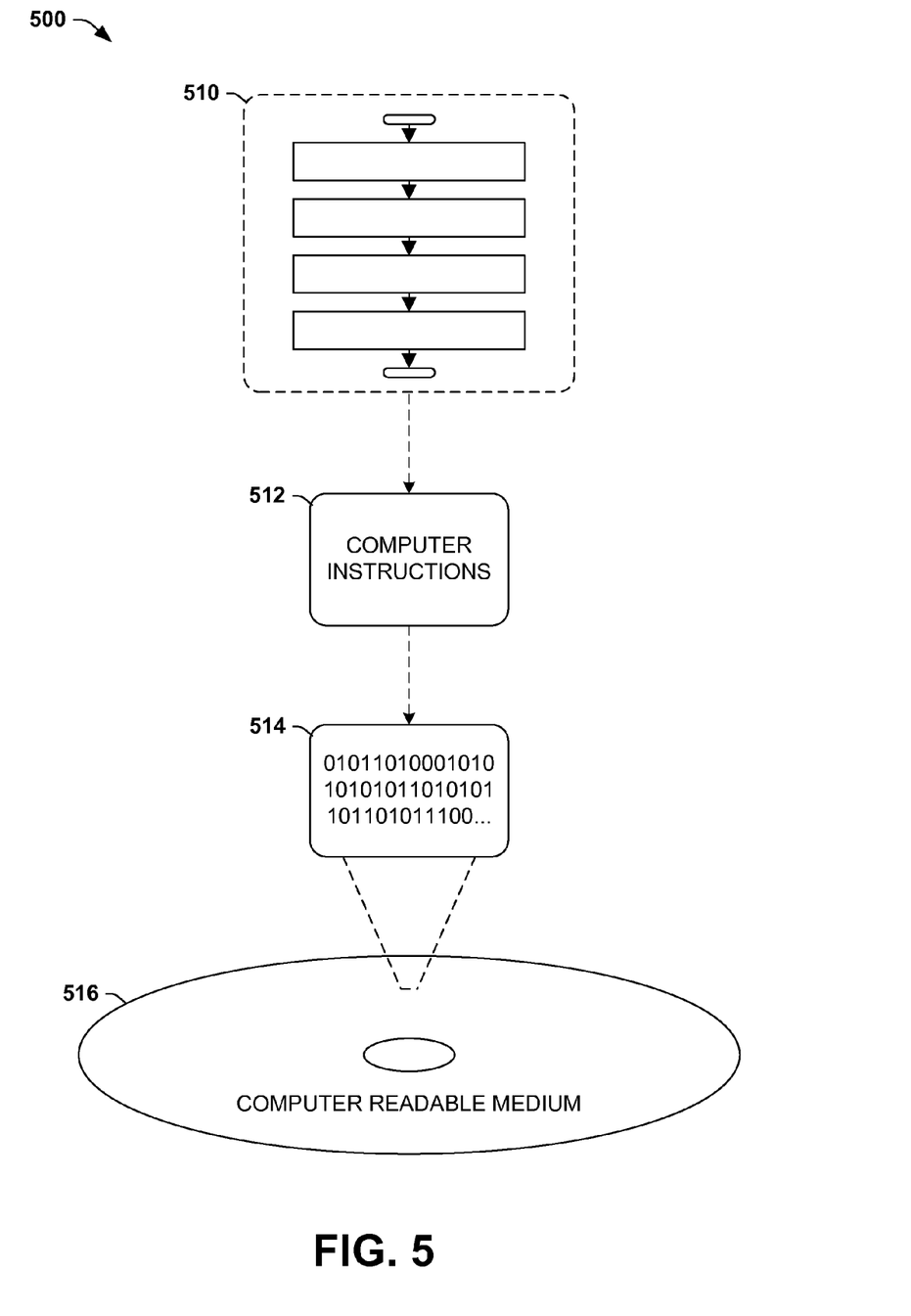
FIG. 5 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 516 (e.g., a CD-R, DVD-R, or a platter of a hard disk drive), on which is encoded computer-readable data 514. This computer-readable data 514 in turn comprises a set of computer instructions 512 configured to operate according to one or more of the principles set forth herein. In one such embodiment 500, the processor-executable computer instructions 512 may be configured to perform a method 510, such as at least some of the exemplary method 100 of FIG. 1 and/or at least some of the exemplary method 200 of FIG. 2, for example. In another such embodiment, the processor-executable instructions 512 may be configured to implement a system, such as at least some of the exemplary system 400 of FIG. 4, for example. Many such computer-readable media 516 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
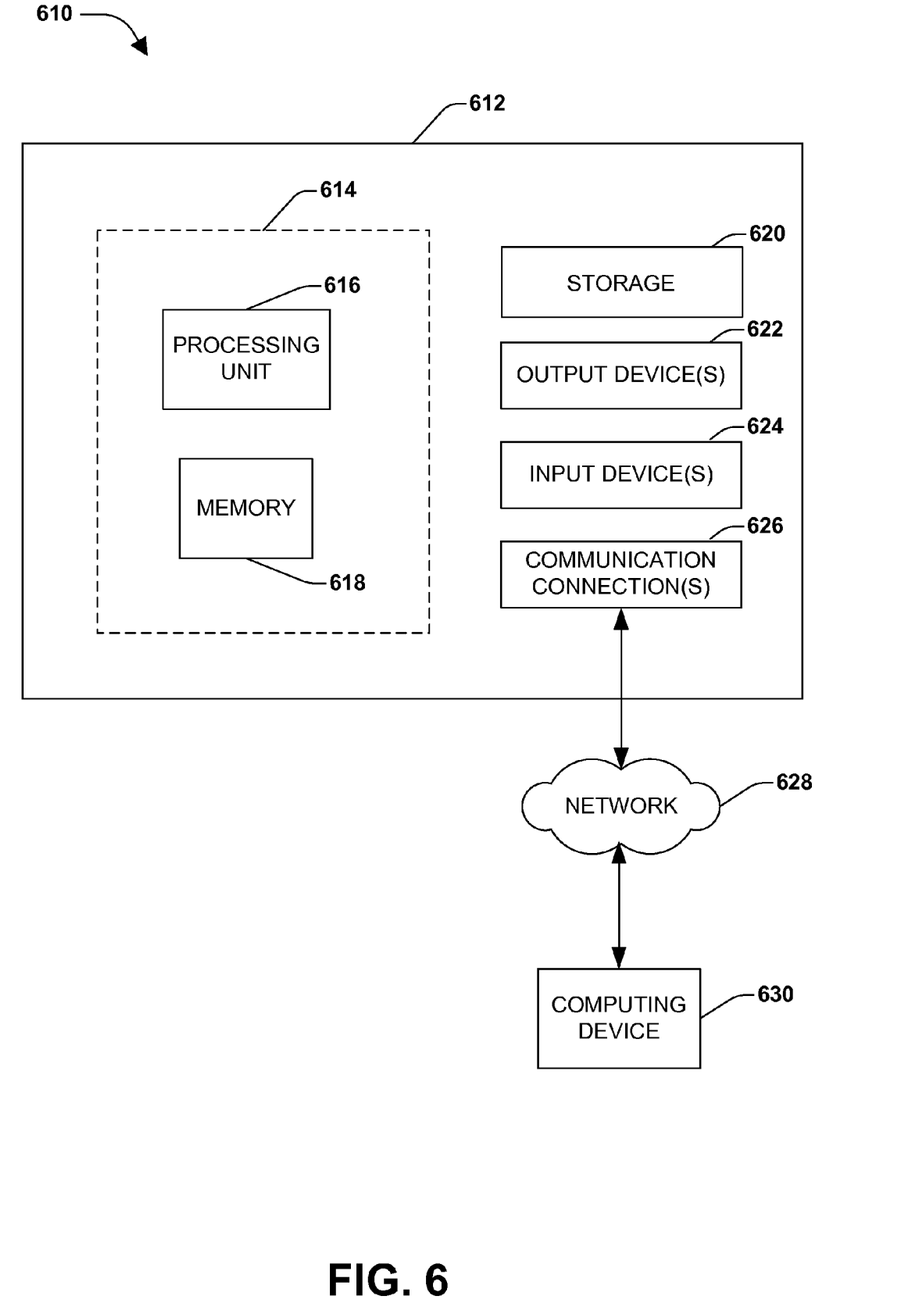
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example), or some combination of the two. This configuration is illustrated in FIG. 6 by dashed line 614.

In other embodiments, device 712 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for document collaboration, comprising:
generating, using at least one processing device, collaboration context data for a document stored in a central database and electronically accessible by a plurality of entities via one or more networks, the collaboration context data including one or more entries associated with at least one of a previous edit or a previous access of the document;
providing the collaboration context data for the document via the one or more networks, without concurrently providing the document, upon receiving an indication of an email containing a reference to the document being at least one of viewed or previewed in an email application at a first time by an entity of the plurality of entities;
automatically updating the collaboration context data for the document stored in the central database, using the at least one processing device, to create updated collaboration context data that includes information regarding one or more activities associated with the document stored in the central database occurring between the first time and a second time by one or more entities of the plurality of entities; and
automatically providing the updated collaboration context data for the document via the one or more networks, without concurrently providing the document, upon receiving another indication of the email containing the reference to the document being at least one of viewed or previewed in the email application at the second time by the entity of the plurality of entities for display concurrently with the reference presented within the email, such that the email comprising the reference, the reference comprised within the email, and the updated collaboration context data are displayable concurrently.

2. The method of claim 1, wherein receiving an indication comprises receiving a request from the email application.

3. The method of claim 2, wherein the email application comprises at least one of an email service or an email client.

4. The method of claim 1, wherein the collaboration context data comprises information regarding at least one of one or more edits or one or more accesses of a second document stored in the central database, the second document being associated with the first document.

5. The method of claim 1, wherein the collaboration context data comprises information regarding a first entity that made the at least one of the previous edit or the previous access of the document.

6. The method of claim 1, further comprising:
storing the document in the central database based upon a request to store the document from a first entity.

7. The method of claim 1, wherein the reference comprises a hyperlink corresponding to a location where the document is stored in the central database.

8. The method of claim 1, further comprising:
updating the document stored in the central database based upon one or more edits made to the document.

9. The method of claim 1, wherein the email comprising the reference and the reference comprised within the email are displayable within a first portion of a user interface of the email application, and the updated collaboration context data is displayable in a second portion of the user interface.

10. A system for document collaboration, comprising:
at least one processing device;
memory operatively coupled to the at least one processing device;
an email application operatively stored on the memory and operable by the at least one processing device to perform operations including at least:
receive a message including a reference to a document stored in a central database and electronically accessible by a plurality of entities via one or more networks;
upon at least one of viewing or previewing the message at a first time, receive collaboration context data for the document stored in the central database, without concurrently receiving the document, the collaboration context data including one or more entries associated with at least one of a previous edit or a previous access of the document; and
upon at least one of viewing or previewing the message at a second time, receive updated collaboration context data for the document stored in the central database, the updated collaboration context data information regarding one or more activities associated with the document stored in the central database occurring between the first time and a second time, wherein at least one of
the collaboration context data or the updated collaboration context data are displayable in a user interface of the email application concurrently with the message including the reference to the document stored in the central database, such that the message including the reference, the reference included within the message, and the at least one of the collaboration context data or the updated collaboration context data are concurrently displayable within the user interface of the email application.

11. The system of claim 10, wherein the operations further include send one or more entity preference defining a desired scope of the collaboration context data.

12. The system of claim 10, wherein the operations further include concurrently display the message including the reference and the reference included within the message in a first portion of the user interface, and concurrently display the collaboration context data in a second portion of the user interface.

13. The system of claim 10, wherein the collaboration context data include information regarding at least one of one or more edits or one or more accesses of a second document stored in the central database, the second document being associated with the first document.

14. The system of claim 10, wherein the collaboration context data comprises less than all of at least one of previous edits or previous accesses made to the document.

15. The system of claim 10, wherein the reference comprises a hyperlink corresponding to a location where the document is stored in the central database.

16. The system of claim 10, wherein the collaboration context data comprises information regarding an entity that made at least one of the previous edit or the previous access of the document.

17. The system of claim 10, wherein the email application comprises at least one of an email service or an email client.

18. A system, comprising:
    circuitry configured for generating collaboration context data for a document stored in a central database and electronically accessible by a plurality of entities via one or more networks, the collaboration context data including one or more entries associated with at least one of a previous edit or previous access of the document;
    circuitry configured for providing the collaboration context data for the document via the one or more networks, without concurrently providing the document, upon receiving an indication of an email containing a reference to the document being at least one of viewed or previewed in an email application at a first time by an entity of the plurality of entities;
    circuitry configured for automatically updating the collaboration context data for the document stored in the central database to create updated collaboration context data that includes information regarding one or more activities associated with the document stored in the central database occurring between the first time and a second time by one or more entities of the plurality of entities; and
    circuitry configured for automatically providing the updated collaboration context data for the document via the one or more networks, without concurrently providing the document, upon receiving another indication of the email containing the reference to the document being at least one of viewed or previewed in the email application at the second time by the entity of the plurality of entities for display concurrently with the reference presented within the email, such that the email comprising the reference, the reference comprised within the email, and the updated collaboration context data are displayable concurrently.

19. The system of claim 18, wherein the email comprising the reference and the reference comprised within the email are displayable within a first portion of a user interface of the email application, and the updated collaboration context data is displayable in a second portion of the user interface.

20. The system of claim 18, wherein at least one of the collaboration context data or the updated collaboration context data include information regarding one or more activities associated with a second document stored in the central database, the second document being associated with the document.

\* \* \* \* \*